(No Model.)
R. W. SHELBOURNE.
LOG PUSHER FOR SAW MILLS.
No. 338,884. Patented Mar. 30, 1886.
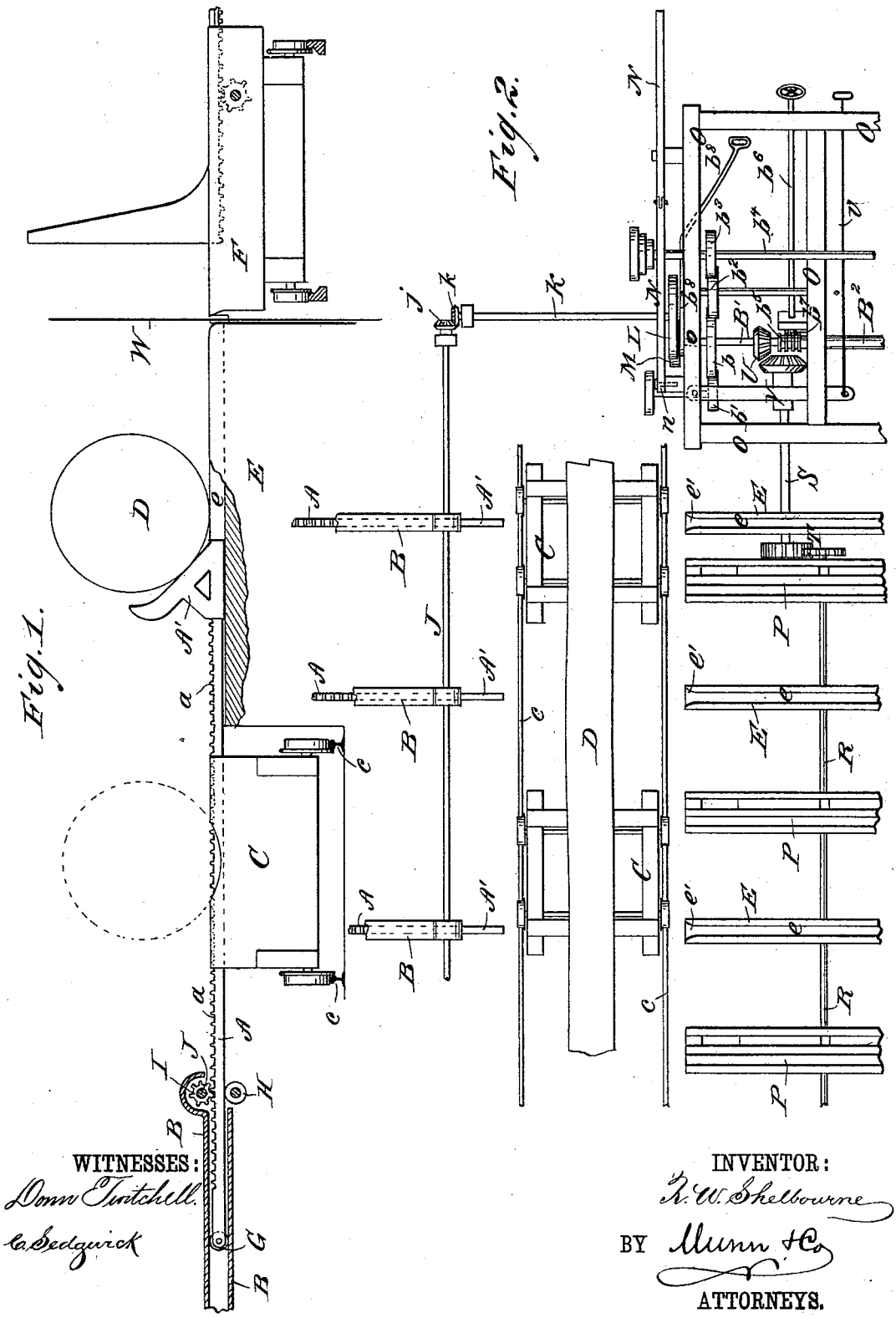
WITNESSES:
Donn Twitchell
C. Sedgwick
INVENTOR:
R. W. Shelbourne
BY Munn & Co
ATTORNEYS.

UNITED STATES PATENT OFFICE.

ROBISON W. SHELBOURNE, OF BLANDVILLE, KENTUCKY.

LOG-PUSHER FOR SAW-MILLS.

SPECIFICATION forming part of Letters Patent No. 338,884, dated March 30, 1886,

Application filed July 6, 1885. Serial No. 170,775. (No model.)

*To all whom it may concern:*

Be it known that I, ROBISON W. SHELBOURNE, of Blandville, in the county of Ballard and State of Kentucky, have invented new and Improved Log-Pushers for Saw-Mills, of which the following is a full, clear, and exact description.

My invention relates to apparatus for loading logs onto the saw-mill carriage by the machinery of the mill; and the object of the invention is to facilitate this operation at a saving of time and labor over other methods of performing the work.

The invention consists in certain novel constructions and arrangements of the log-pushing apparatus, comprising pushers fitted in slideways arranged transversely to the carriage and outside of a truck or trough on which the logs are brought into the mill-house, and mechanism operating the pushers from the mill-driving shaft, whereby the log will automatically be pushed from the log truck or trough onto the mill-carriage, all as hereinafter fully described and claimed.

Reference is to be had to the accompanying drawings, forming part of this specification, in which similar letters of reference indicate corresponding parts in both the figures.

Figure 1 is a side elevation of one of the log-pushers, with its casing in section, and showing its relative arrangement with the log-truck, the guides or skids, and the saw-mill carriage, said truck, skids, and carriage being shown in end view; and Fig. 2 is a plan view showing the forward ends of the pushers, the log-truck, the skids, the saw-frame in part, and the driving mechanism of the pushers.

The letters A indicate the main bars of the log-pushers, which are formed with racks $a$ on their upper edges, and are fitted to slide in tubular ways B, supported suitably to allow the pusher-bar heads A' to be projected across the log-truck C, on which the logs are brought into the mill-house, and so as to roll or push the logs D from the truck across the skids E onto the saw-mill carriage F, the skids E having grooves $e$, in which the pusher-bars A A' slide, the grooves also having flaring as at $e'$, to allow free entrance of the pushers into the grooves as the bars are projected.

I provide each of the bars A with a roller, G, at the inner end to run in the casing B, and a roller, H, is journaled below the bar and opposite the pinion I, which meshes with the rack $a$ of the bar, said rollers G H making the pushers run easier and more smoothly as they are operated by the pinions.

The drawings represent three pushers, A A', and three corresponding grooved skids, E, in which they work; but two or more than three pushers may be used, as occasion may require.

The driving-pinions I, one for each pusher, are all made fast to a shaft, J, which is journaled to suitable supports, and at one end carries fixedly the bevel-pinion $j$, which meshes with the bevel-pinion $k$ on the end of a shaft, K, which carries at its other end the friction-wheel L, which may be thrown into engagement with a friction-wheel, M, on the driving-shaft B' by means of a lever-bar or compound lever, N, which is pivoted at $n$ to the saw-frame O, and extends within reach of the sawyer, the shaft K being journaled in the lever N, to admit of throwing the wheel L to and from the wheel M, as may be required.

The shaft B' is journaled at $o$ in the saw-frame O, to allow its friction-wheel $b$ to be thrown into contact with the friction-wheel $b'$, to move the log-carriage for feeding the log to the saw, or to be thrown into contact with the friction-wheel $b^2$, to run back the log-carriage. The friction-wheel $b^2$ is run continuously by the friction-wheel $b^3$, fixed on the shaft $b^4$ of the saw, and the friction-wheel $b'$ is run by a belt on a cone-pulley on its shaft, running over a cone-pulley on the saw-shaft, in the usual or any approved way.

At $b^5$ is an annular rack formed on a sleeve, B², which is fitted to slide on the driving-shaft B', and which carries a gear-wheel, (not shown,) which meshes with a rack on the log-carriage to move the carriage, and the sleeve B² has a clutch, (not shown,) which may be engaged with a clutch on the end of the shaft B' when the carriage is to be operated, and may be disengaged when the carriage is to rest, to allow the log-pushers to be operated, as presently explained. The sawyer may turn a shaft, $b^6$, which carries a pinion, $b^7$, meshing with the rack $b^5$ on the sleeve $B^2$, for engaging or disengaging the clutch, as required.

The construction and operation of the friction-wheel gearing for operating the carriage are described in detail in an application for log-turners filed of even date herewith, said gearing being herein referred to briefly, as it, with the addition of the friction-wheels L M, serves to operate the log-pushers A A', and said application for log-turners also particularly describes the guide-blocks P and their push-arms and folding benches, which are operated by shafts R S, gearing T U, controlled by lever V, and rod $v$, said blocks P being herein shown, as they serve also as skids onto and over which the logs D are rolled by the pushers A A', thus supplementing the skids E in giving substantial support to the logs on their way from the log-truck to the mill-carriage.

The tubular casings B protect the pushers and their operating pinions and shield the outer parts of the pushers from the weather, as only a small portion of the casings extends into the mill next the log-truck way, which way consists, preferably, of tracks $c c$, on which the wheels of the truck C run.

To operate the log-pushers, the clutch on the sleeve $B^2$ will be disengaged by turning the shaft $b^6$ to ungear the log-carriage from the driving-shaft B', and the gears U will also be disengaged, as shown, to allow the log-turning devices in the guide-blocks P to rest, and the lever or handle bar $b^8$, connected to shaft B', will be drawn upon by the sawyer to bring the friction-wheel $b$ of shaft B' against the backing-off friction-wheel $b^2$, and when the log-truck, with its log, is run up to proper position between the pushers A A' and the skids E or E P, as in Fig. 2, the lever N will be operated to press the friction-wheel L of shaft K to the rotating friction-wheel M on the shaft B', and thereby rotate the shafts K J and pinions I to project the pusher-bars A from their casings B and force their heads A' to the log D, to push it from the truck C across the skids E and onto the mill-carriage. To run back the pushers A A', the bar $b^8$ will be operated to throw the friction-wheel $b$ against the friction-wheel $b'$, and, if desired, and to save time, the projected pushers may so remain until the log they had just rolled onto the carriage is dogged thereto and is being fed to the saw, when the pushers may be backed within their casings by throwing the friction-wheel L to the friction-wheel M, as the carriage is moving forward, to back the pushers at the same time that the cut is made through the log.

The skids E or E P are not essential to the successful operation of the log-pushers A A', as the log-truck may be arranged directly at the front of the carriage, when the log-turning apparatus fitted in the guide-blocks P may not be used, and in which case the logs would be pushed by the bars A A' directly from the log-truck onto the mill-carriage, as will readily be understood.

It is obvious that an ordinary log-trough may be used instead of the truck C $c$ herein shown and described, and in which case the ends of the pusher-casings B may be connected directly to the side of the trough, so that the pusher-heads A' would move across the trough to push the log therefrom onto the mill-carriage, the logs being hauled up and along the trough by a chain or rope and suitable tackle or gearing, in the usual or any approved way, said trough serving as a full equivalent of the truck in carrying out my invention.

Having thus described my invention, what I claim as new, and desire to secure by Letters Patent, is—

1. A log-pushing apparatus for saw-mills, comprising log-pushers A A', fitted in slideways arranged transversely to the mill-carriage and outside of a truck or trough on which the logs are brought into the mill-house, and mechanism, substantially as described, for operating the pushers from the driving-shaft of the mill, whereby the log will automatically be pushed from the log truck or trough onto the mill-carriage, substantially as herein set forth.

2. A log-pushing apparatus for saw-mills, comprising log-pushers A A', fitted in slideways arranged transversely to the mill-carriage and outside of a truck or trough on which the logs are brought into the mill-house, and grooved skids arranged between the pushers and the carriage, to serve as guides to the pushers and as supports to the log, substantially as herein set forth.

3. The combination, in log-pushers for saw-mills, of the pushers A A', provided with racks $a$, casings forming guides therefor, a shaft, J, pinions I thereon, meshing with racks $a$, and gearing, substantially as described, for operating shafts J from the driving-shaft of the mill, substantially as herein set forth.

4. The combination, in log-pushers for saw-mills, of the pushers A A', provided with racks $a$, casings forming guides therefor, a shaft, J, pinions I thereon, the shaft K, bevel-gearing $j k$, friction-wheels L M, driving-shaft B', and means, substantially as described, for engaging said wheels L M and for rotating the shaft B' in reverse directions, for projecting and backing the pushers A A', substantially as herein set forth.

5. The combination, in log-pushers for saw-mills, of the pushers A A', provided with racks $a$, casings forming guides therefor, a shaft, J, pinions I thereon, the shaft K, bevel-gearing $j k$, friction-wheels L M, driving-shaft B', lever N, and friction wheels or gearing, substantially as described, for rotating the shaft B' in reverse directions, substantially as herein set forth.

6. In a log-pusher for saw-mills, constructed substantially as shown and described, the combination, with the tubular guideways B, of the pushers A A', working in said tubular guides and provided with rollers G on their inner ends in said guides, and means for operating the pushers, substantially as herein set forth.

7. In log-pushers for saw-mills, constructed substantially as shown and described, the combination, with the pushers A A', provided with the racks $a$ on one side and with the rollers G at their inner ends, and the shafts J, journaled above the pushers and provided with the pinions I, meshing with the racks, of the pushers and the rollers H below the racks and opposite the pinions I, substantially as set forth.

ROBISON W. SHELBOURNE.

Witnesses:
BEN FLINT,
W. J. PUCKETT.